United States Patent
Mather

(10) Patent No.: US 6,957,253 B1
(45) Date of Patent: Oct. 18, 2005

(54) TRANSACTIONAL COMPUTER SYSTEM

(75) Inventor: Andrew H. Mather, London (GB)

(73) Assignee: Balaena Limited, London (GB)

(*) Notice: Subject to any disclaimer, the term of this patent is extended or adjusted under 35 U.S.C. 154(b) by 0 days.

(21) Appl. No.: 09/786,263

(22) PCT Filed: Sep. 3, 1999

(86) PCT No.: PCT/GB99/02906

§ 371 (c)(1),
(2), (4) Date: Jul. 12, 2001

(87) PCT Pub. No.: WO00/14663

PCT Pub. Date: Mar. 16, 2000

(30) Foreign Application Priority Data

Sep. 4, 1998 (GB) .................................. 9819392

(51) Int. Cl.[7] .......................................... G06F 17/60
(52) U.S. Cl. ........................ 709/220; 709/223; 705/26
(58) Field of Search ................. 705/80; 709/220–223

(56) References Cited

U.S. PATENT DOCUMENTS

| | | | | |
|---|---|---|---|---|
| 4,412,287 A | * | 10/1983 | Braddock, III ............... | 705/37 |
| 5,249,300 A | | 9/1993 | Bachman et al. | |
| 5,319,544 A | * | 6/1994 | Schmerer et al. ............ | 705/28 |
| 5,390,330 A | | 2/1995 | Talati | |
| 5,553,143 A | * | 9/1996 | Ross et al. ................... | 705/59 |
| 5,638,539 A | | 6/1997 | Goti | |
| 5,742,932 A | * | 4/1998 | Levitsky .................... | 705/410 |
| 5,794,207 A | * | 8/1998 | Walker et al. ................ | 705/1 |
| 5,794,212 A | * | 8/1998 | Mistr, Jr. .................... | 705/26 |
| 5,809,144 A | * | 9/1998 | Sirbu et al. .................. | 705/53 |
| 5,845,266 A | * | 12/1998 | Lupien et al. ............... | 705/37 |
| 5,850,442 A | * | 12/1998 | Muftic ........................ | 705/65 |
| 5,873,071 A | * | 2/1999 | Ferstenberg et al. ......... | 705/37 |
| 5,905,975 A | * | 5/1999 | Ausubel ...................... | 705/37 |
| 6,014,643 A | * | 1/2000 | Minton ........................ | 705/37 |
| 6,041,308 A | * | 3/2000 | Walker et al. ............... | 705/14 |
| 6,073,124 A | * | 6/2000 | Krishnan et al. ............ | 705/59 |
| 6,085,178 A | * | 7/2000 | Bigus et al. ................. | 705/80 |
| 6,192,131 B1 | * | 2/2001 | Geer et al. .................. | 380/283 |
| 6,236,972 B1 | * | 5/2001 | Shkedy ........................ | 705/1 |

(Continued)

FOREIGN PATENT DOCUMENTS

| | | |
|---|---|---|
| GB | 2271002 A | 3/1994 |
| WO | WO 94/19742 | 9/1994 |

Primary Examiner—Richard Chilcot
(74) Attorney, Agent, or Firm—Greenberg Traurig

(57) ABSTRACT

A transactional computer system comprises a plurality of entities including at least one entity of each of the following forms, a Thing entity having the properties of identifying a client system and uniquely identifying an object in that client system, a Proposal entity for defining a transaction, the Proposal entity being subordinate directly or indirectly to a Thing entity and having the properties of modelling at least one external agent to carry out a transformation in relation to the first entity, and a Decision entity capable of communicating with a Proposal entity and having the properties of defining the types of decision that may be made, and determining the responses in relation to those decisions. The system preferably further comprises at least one Assignment entity subordinate to an associated Thing entity, the Assignment entity having the properties of uniquely identifying the associated Thing entity, and identifying a particular type of assignment or transformation to be applied to the Thing entity. This entity may be combined with the Proposal entity. Additionally the computer system preferably comprises at least one Tender entity associated with a plurality of Proposal entities and a single Thing entity, and identifying at least a quantity.

29 Claims, 9 Drawing Sheets

U.S. PATENT DOCUMENTS 6,243,691 B1 * 6/2001 Fisher et al. .................. 705/37
6,266,640 B1 * 7/2001 Fromm ....................... 704/273
6,330,551 B1 * 12/2001 Burchetta et al. ............. 705/80
6,385,594 B1 * 5/2002 Lebda et al. .................. 705/38
6,418,415 B1 * 7/2002 Walker et al. ................ 705/26

* cited by examiner

TRANSACTIONAL COMPUTER SYSTEM

BACKGROUND OF THE INVENTION

This invention relates to a transactional computer system, namely a computer system adapted to perform negotiation and decision making functions related to a transaction.

Transactional computer systems are known for use in the financial and business world for conducting transactions such as, for example, ordering product, currency exchange, or the sale and purchase of stock, shares and bonds. Such systems are designed specifically for the particular function or functions which they are to perform.

Rule-based systems using what is generally known as artificial intelligence are also known. These are based on a large number of rules which are specific to the particular environment in which they are to be used. A given system is designed for a particular type of transaction, and if a new type of transaction is envisaged a new system will have to be designed specifically for that purpose.

I have appreciated that it would be highly desirable to provide a generalised transactional system which can be adapted to many specific types of transaction, and furthermore I have appreciated that such a generalised transactional computer system can be made by using the ideas and features described in the following and claimed in the claims appended to this description.

SUMMARY OF THE INVENTION

The invention is defined in the independent claims below to which reference should now be made. Advantageous features are set forth in the appendant claims.

According to the present invention there is provided a transactional computer system comprising a plurality of entities including at least one entity of each of the following forms, a first entity (Thing entity) having the properties of identifying a client system and uniquely identifying an object in that client system, a second entity (Proposal entity) for defining a transaction, the second entity being subordinate directly or indirectly to a first entity and having the properties of modelling at least one external agent to carry out a transformation in relation to the first entity, and a third entity (Decision entity) capable of communicating with a second entity and having the properties of defining the types of decision that may be made, and determining the responses in relation to those decisions.

Preferably the computer system further comprises at least one fourth entity (Assignment entity) subordinate to an associated first entity, the fourth entity having the properties of uniquely identifying the associated first entity, and identifying a particular type of assignment or transformation to be applied to the first entity. This entity may be combined with the second entity.

Additionally the computer system preferably further comprises at least one further entity (Tender entity) associated with a plurality of second entities and a single first entity, and identifying at least a quantity.

BRIEF DESCRIPTION OF THE DRAWINGS

The invention will now be described in more detail by way of example, with reference to the drawings, in which.

DETAILED DESCRIPTION OF THE PREFERRED EMBODIMENT

General Description

Figure 1:
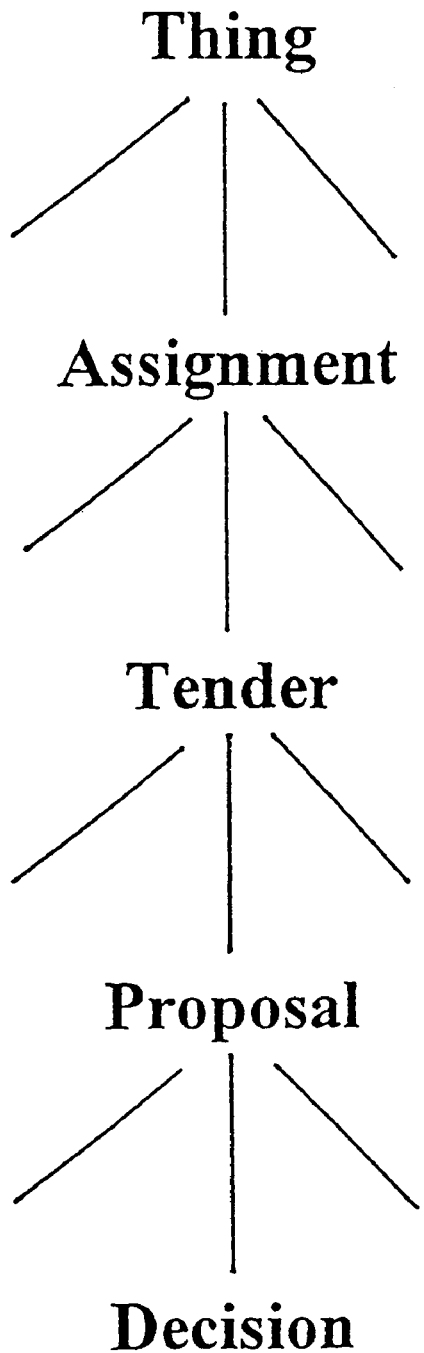
FIG. 1 illustrates the hierarchical structure of the entities in a preferred computer system embodying the invention.

This system is embodied in a computer software module which, when included in a client system, will capture the complexity of its negotiations, but leave the description of those transactions to the client system. The system makes possible the management of the transaction space in a straightforward and effective manner. It does not, however, manage the transaction space directly. Rather, it supports the modelling of the transaction space in a convenient and effective manner, and then, once modelled, it is for the client system to respond to the situations discerned and captured in the model. The power of the system is in its flexibility for modelling and managing the client system's complex transaction space.

The system will only capture and supply information without using it for its own internal manipulation. It is better to record what people claim, and then leave the external clients/parties to resolve their claims, than it is to try to decide the truth of a matter. Consequently, the validity or otherwise of the supplied information has no bearing on the system. However, it may have a significant bearing on the satisfactory use of the system; therefore the client system should validate the information supplied and act accordingly.

The system comprises a hierarchy of entities: a Thing, a Proposal and a Decision, and optionally an Assignment and/or a Tender. Each entity type has a set of properties appropriate to its role. These are described in more detail below as part of the preferred embodiment. It is a feature of the system that an extension of the modelling environment can be achieved by the provision of additional properties per entity.

The Thing Entity

The system supports the modelling of the existence of external objects by provision of a 'Thing' entity. In the preferred embodiment, the Thing entity has fields ClientSystem, and ClientSystemReference. The ClientSystem field is an identifier of the client system itself, and the ClientSystemReference field is an identifier by which the implicit existence of an object identified by that Reference is posited.

No validation as to the nature of that implicit object is either attempted or warranted, nor of any other information pertaining to the world outside the system.

A ClientSystemReference to a Thing must be unique, so that all behaviours and data to a common external thing will be mapped and managed by a common internal Thing.

Client applications must ensure that they have implemented an appropriate nomenclature to ensure unique references per client system.

The Assignment Entity

The system supports the modelling of assignments or transformations applied to external objects. It does so by provision of an 'Assignment' entity. An Assignment, for the purposes of the system, is regarded as a transformation that may be applied to a Thing, for example an operation which can be conducted in relation to an object. Thus, in the system's entity hierarchy, an Assignment is subordinate to and applies to a Thing.

An Assignment will comprise in particular an identifier for the particular type of assignment or transformation to be applied. This key information is supplied by the external client system in the Assignment's 'Redirection' field, see below.

Timing of an assignment will often be significant to the external client. A facility to recognise timing may, if desired, be provided by the inclusion of fields appropriate to each of the distinct entity types. In particular, fields relating to overall deadlines for Assignments may be included in that entity.

Linking Assignments

The system supports sequential modelling of assignments. As an example: with a Thing(CAR), Assignment(WASH) might be followed by Assignment(DRY). The assignment sequence is maintained by referring to WASH as the predecessor to DRY.

The Tender Entity

The client system is allowed to group together a set of proposals, thus allowing more complex negotiation behaviours to be modelled. For example, as its name implies, Tenders and auctions may be modelled. The system allows the creation of the Tender entity and notes its corresponding external reference.

The Proposal Entity

The system includes an important facility to model the existence of agents to carry out the transformations. As an example this might be a cleaning machine which is required to wash a car. This is supplied by a 'Proposal' entity.

A client system wishing to identify the potential for an agent to impact an assignment's fulfilment will create a Proposal. Since in the preferred embodiment the Proposal has a bearing on a particular Assignment, it is subordinate to an Assignment in the hierarchy and in the preferred embodiment applies to a single Assignment only. Where there is no Assignment entity, a Proposal may be subordinate to a Thing; either way it is seen that a Proposal is subordinate directly or indirectly to a Thing.

The identification of an agent by a client system is at no time validated by the system, but is deemed to be supplied by the client system as a rational and satisfactory identity.

The system provides for modelling situations where the potential action of the agent may often have arisen as a matter of negotiation. The counter-party to the agent in this negotiation is also identifiable by the client system.

The system includes a facility to distinguish the current direction of the negotiation.

The Proposal itself carries a rich set of features, sufficient and appropriate to the complexity of the environments it is intended to be capable of modelling.

The preferred embodiment supports the following features within a Proposal, each being a field supporting input by the client system. The identity of the agent capable of impacting the Assignment is held in the field 'Downline'. The counterparty to the agent in this negotiation is held in the field 'Upline'. In regard to a specific proposal, the Upline will have no direct impact upon the Assignment. The direction of the negotiation is implemented as a boolean flag 'DirectionGoingUp', which may be either true or false.

For example, a proposal going DOWN, whereby the party making the proposal is the Upline and expects a reply from the Downline, models a request or command. Conversely, a proposal going UP, whereby the party making the proposal is the Downline and expects a reply from the Upline, models the function of volunteering.

A proposal is something to be considered and a decision made on it. A proposal is therefore conveniently recorded using the expression Consider.Do, as will be seen below.

As indicated above, a facility to recognise timing may be provided by the provision of fields to reflect the same. Deadlines for making a decision, and for complying (completing an assignment) may be included in the Proposal Entity.

Grouping Proposals

By grouping proposals it is possible to extend the flexibility of the modelling environment to support the tracking of complex interactions. For example, cause and effect, flow modelling, command and control and the like, can be grouped. This grouping is accomplished by using Subordinate Proposals and Sibling Proposals.

Subordinate Proposals

A further feature of the preferred system is the modelling of subordinate proposals. For example, in a factory, a Thing(CLIENTORDER) with an Assignment(FILL) may require a sequence of proposals before it can be fulfilled. This may include the interaction of several people. These proposals should be grouped together. To achieve this the ProposalID of the Superior proposal is recorded in all subordinate proposals using the field SuperiorProposalRefID.

Sibling Proposals

A further feature of the system is the grouping together of proposals regarding the same matter. For example, if in a warehouse a customer wants 1000 ball bearings, but there is only 800 on the shelf, then 200 will have to be refused. All of this information will be stored in many proposals, but all regarding the same matter (i.e. the order for 1000 ball bearings). To achieve this grouping all sibling proposal entities store the original ProposalID in the field SiblingProposalRefID.

Combined Proposal/Assignment Entity

As described above, the assignment entity is optional. The features of the assignment entity, if included, may be combined with a proposal entity to provide a combined proposal/assignment entity which has the properties of both a proposal entity and an assignment entity.

The Decision Entity

The system records the response from the counter-party in regard to a corresponding proposal. This is the role of the Decision Entity which is subordinate to and can communicate with a single one of the Proposals. Delegated proposals are tracked by passing the Decision for a Subordinate Proposal to the Superior Proposal. An individual position in a negotiation is tracked by passing a Decision for a Sibling Proposal to all the other Sibling Proposals with the same SiblingProposalRefID field.

The response recorded by the decision entity can be: decline, accept, partially accept, or forward. Forwarding involves accepting the proposal but finding another agent actually to undertake it. The responses are recorded in the form Decline.Do, or Accept.Do, and so on, as appropriate.

The Decision Schema

In order to derive effective meaning from the system, external decisions need to be recorded in a consistent, effective and intuitive manner. The protocol for so doing is implicitly provided by the creation of a logical structure, termed the decision schema. The decision schema comprises multiple dimensions and defines what types of decision may be stored. Each dimension comprises a set of direct fields and a set of derived fields:

Direct fields, define the types of decision that may be stored.

Derived fields summarise the consequences or impact of the decision.

It is desirable that the direct fields represent a set of mutually exclusive states, whereas the derived fields need not be mutually exclusive. Each field is assigned an index into the dimension. A decision type node is then defined as a vector, comprising one index from each dimension. Decisions of that type have their quantities applied to that node, so that each node accumulates a summary of like decisions.

The Decision Schema is a facility which client applications may use to model complex negotiations in a manageable and effective manner. A client application must, however, be clear as to its decision semantics, in order to make use this feature. An example of a Decision Schema is given below in the more detailed description of the preferred embodiment.

The Decision Cube

A decision cube is built in the code in the form of a multidimensional array. It is used to store the quantities associated with each decision. Each element of the array should be initialised to zero.

Design Principles for Decision Schemas

Decision states (within a dimension) are exclusive. It is meaningless to record both an agreement to NotDo something, and yet that it is Done. If an agent agrees to NotDo something, and yet declares it Done, then it is regarded in the context of the system as a rogue agent.

The decision cube does not preclude recording inappropriate or meaningless information. As noted above, it is a fundamental design principle that it is better to record what people claim, and then leave the external clients (or parties) to resolve their claims, than it is to try to decide the truth of a matter. Thus the system can record both a NotDo and a Done, and let the client system scan for such occurrences, and then implement whatever procedures necessary at that point.

Decision states may be partial. This requires the proposal to have a Quantity. For example: a proposal to ship 12 crates of water (Consider.Do.12) may have the response: Accept.Do.6, Decline.Do.4; leaving 2 undecided (Pending).

This also leads to a further observation: that a proposal using a Quantity is deemed to refer to a homogeneous assignment. Thus, with shipping bottles of water, it is assumed that the parties to the proposal are indifferent between two bottles of water from the same assignment. If partial quantities need to be differentiated, then they should be differentiated as different Things, and then renegotiated accordingly. Thus a crate of 20 pieces of fruit (12 Apples and 8 Oranges) is perfectly acceptable as a Thing, provided the system is not expected to discriminate between Apples and Oranges. If it is, then it should be registered as 2 shipments: one of Apples [Quantity 12], and the second as Oranges [Quantity: 8].

Optional Entities

The entities Assignment and Tender are optional members of the hierarchy. Specifically a Proposal may be created for a Thing without requiring an Assignment or Tender. This facility is provided to support very simple scenarios, without the overhead of the unnecessary creation of Assignment and Tender entities. The hierarchy will always include Thing, Proposal and Decision entities. This hierarchical structure is illustrated in FIG. 1.

Requirements

The basic requirements needed to support a physical implementation of the system are:

A facility to define the distinct Entities, their Properties, and the Values associated with these Properties.

A facility to create the Entities.

A facility to have such Entities persist.

A facility to identify particular instances of Entities.

A facility to set, edit and retrieve the Property Values of such Entities.

A facility to manipulate Entities in a Hierarchy.

The Preferred Embodiment

The processes required to implement the system will now be described in more detail, including in particular the construction of the Entity hierarchy, and adding decisions to the hierarchy.

The specific functions (processes) described in more detail below are:

| | |
|---|---|
| NewEntity( ) | The facility to create a new member entity of the hierarchy |
| RegisterEntity( ) | The facility to load an entity (into memory) |
| LoadHierarchy( ) | The facility to load directly a full subordinate tree |
| ApplyDecision( ) | The facility to increment the multidimensional data array, or cube |
| Item( ) | The facility to retrieve a pointer to a member entity |
| Cube: GetValue( ) | The facility to retrieve a cube's value at a particular node |
| NotifyEvent( ) | Advising Client System of an event |

Of these functions, only two are intended to be accessible to clients/parties external to the system, namely NewEntity( ) and Item( ) . The function LoadHierarchy( ) could be achieved by multiple applications of RegisterEntity( ) but it is convenient to have it available as a separate function in its own right.

The only further facility required to provide an effective minimal embodiment of the system is then:

EntityPropertyValue( ): Retrieve the Value of a Property of an Entity.

This is a trivial process and need not be further discussed.

The utility of the system will often require a client application to be able to determine the state of a particular entity, by examining its properties. This function provides that facility.

The following describes the sequencing and sub-processes necessary to support each of the key function processes highlighted above. The descriptions should be read in conjunction with the flowcharts in FIGS. 2 to 9 with the same title. Numeric references refer to these flow-charts individually.

In the preferred embodiment of the system, the hierarchy consists of Things, Assignments, Tenders, Proposals and Decisions. Since their processing internal to the system is largely similar, it is more convenient to regard them all as instances of a generalised Entity. An implementation of NewEntity( ) therefore may be read as "Construct a facility, of the type: NewEntity(EntityTypeName) where EntityTypeName is one of: Thing, Assignment, Tender, Proposal, Decision."This allows further hierarchies to be readily developed, but at the cost of more sophisticated code to handle the distinct types.

Notation:

| Numbers: | 1. | Numbered boxes in the accompanying flow-charts. |
|---|---|---|
| Restrictions: | [Thing only] | Entities only of [this] type |
| Exclusions: | [Not Thing] | Entities not of [this] type |
| Universal: | [All] | Entities of all Types. |

NewEntity( )

Figure 2:
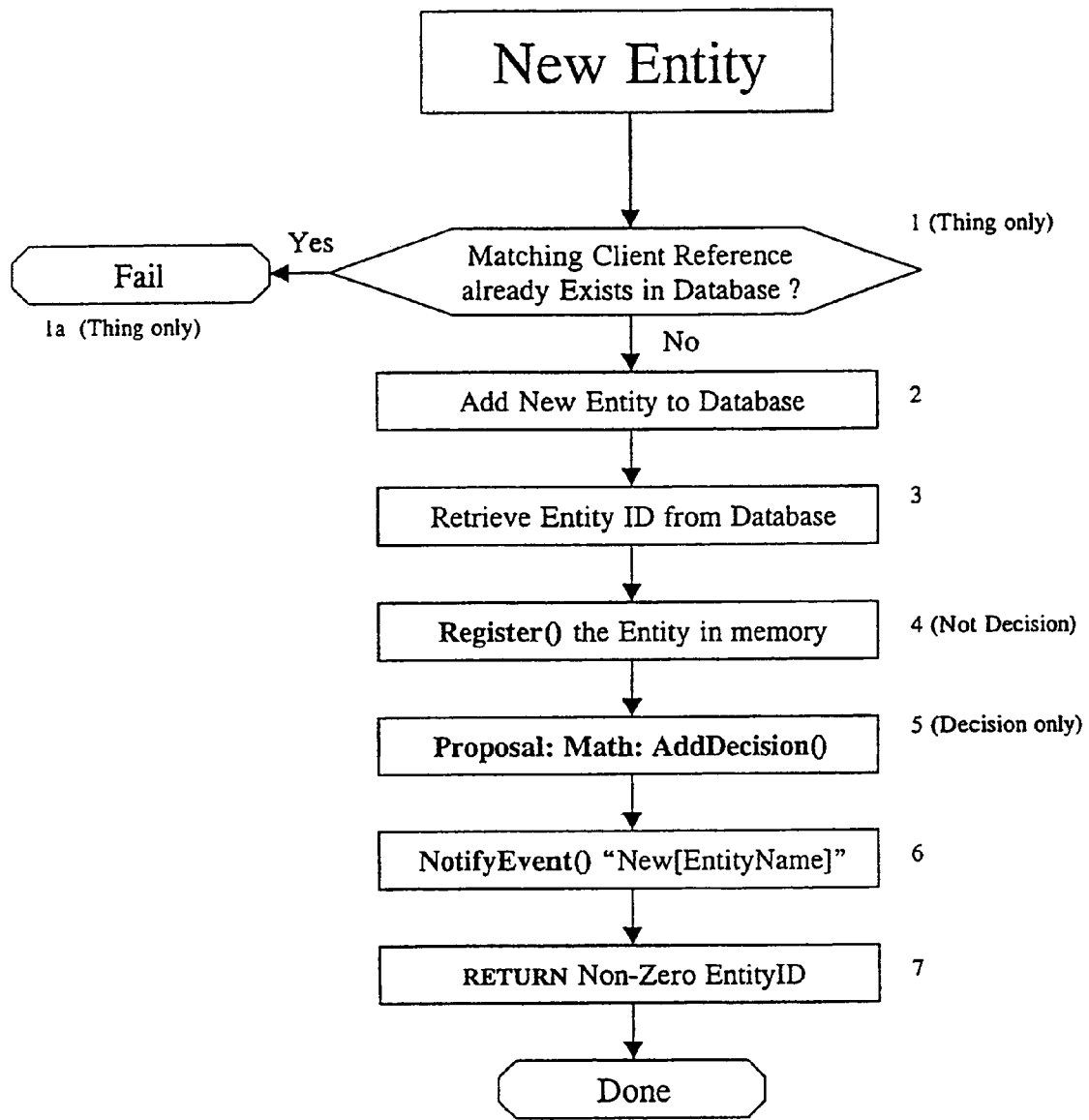
FIG. 2 is a flow chart illustrating the NewEntity procedure in the preferred embodiment of the invention.

This is the facility to create a new member entity of the hierarchy and is illustrated in FIG. 2 of the drawings. The procedure applies to all the entities Thing, Assignment, Tender, Proposal, and Decision. Note however that Step 1 applies only to a Thing, Step 4 does not apply to Decision, and Step 5 applies only to Decision.

Arguments: The Properties of that Entity. See Entity Properties, Below.

1. [Thing only] A Client Reference to a Thing should be unique. A check is made to see if such a Client Reference already exists.
1a. If it does, the process is deemed to have failed.
2. [All] Add a new record to the appropriate EntityType database table. Include the data from the arguments to the NewEntity( ) call.
3. Retrieve a unique ID (within that EntityType) for the new entity.
4. Register( ) the new entity in memory, see below and FIG. 3. (Create a new object in memory, of that type, with the appropriate data as supplied by the arguments in the call to the function.)
5. Proposal: Math: AddDecision( ), see below and FIG. 5. Since something has happened which could have a bearing on the client systems behaviour (e.g. a new Thing to be considered, new Assignment to be processed, new Tender to be negotiated, Proposal to be considered, or Decision to be evaluated), an EventNotification is sent out to the client system to make it aware of the event, in particular its type, and its ID. See NotifyEvent( )
6. NotifyEvent( ). Finally, an ID is returned (non-zero, in this embodiment), unique within the EntityType, so that the caller of the process may subsequently refer to this particular new entity, in calls to Item( ), by its new EntityName.

RegisterEntity( )

Figure 3:
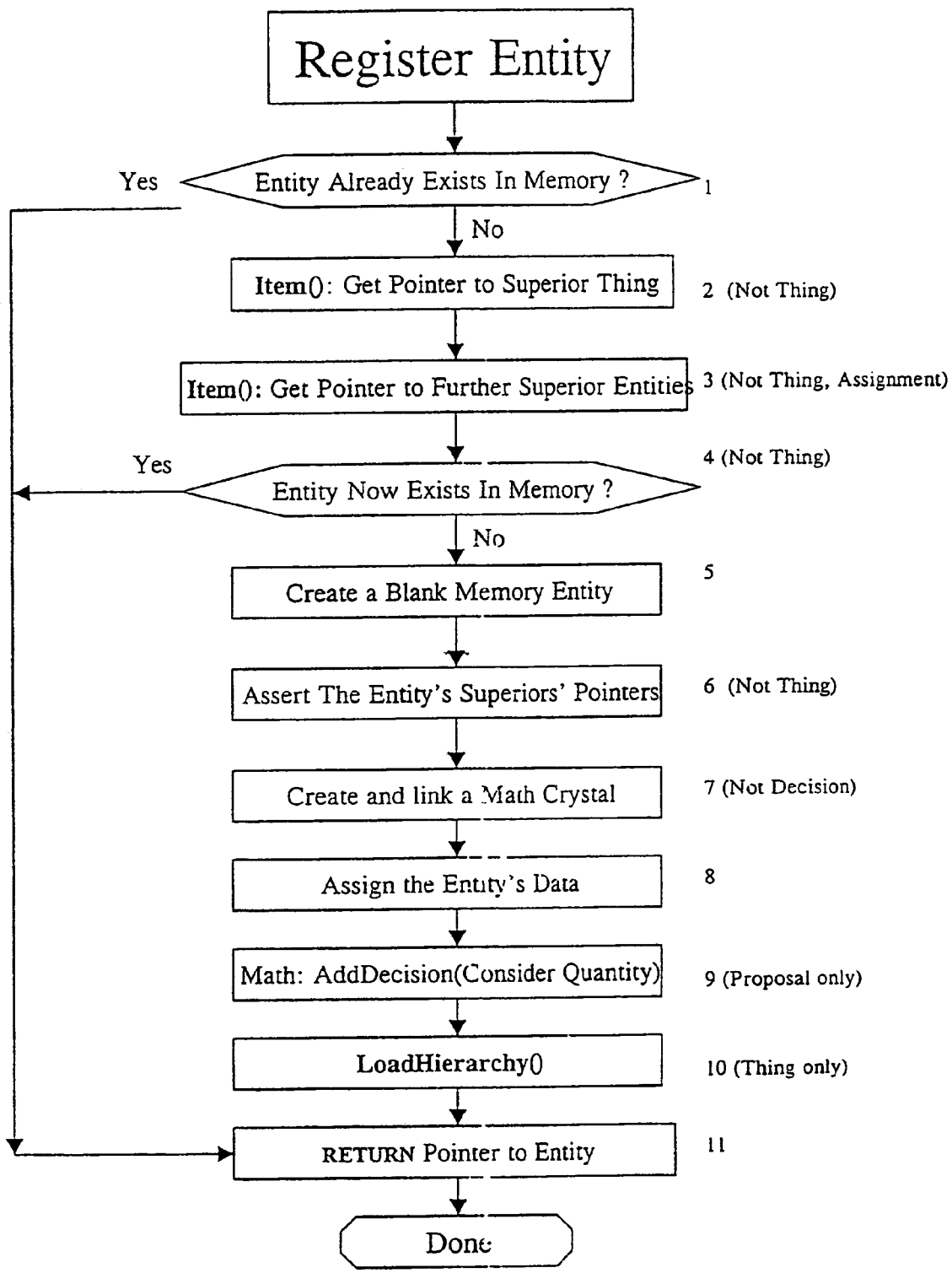
FIG. 3 is a flow chart illustrating the RegisterEntity procedure in the preferred embodiment of the invention.

This is the facility to load an entity (into memory), and is illustrated in FIG. 3 of the drawings. The procedure also applies to all the entities Thing, Assignment, Tender, Proposal, and Decision. Note however that Steps 2, 3, 4 and 6 do not apply to a Thing, Step 3 does not apply to Assignment, Step 7 does not apply to Decision, and Step 9 applies only to Thing.

Arguments: The properties of that Entity. See Entity Properties.

Arguments: In addition, the ID's of the Entity's superiors in the Hierarchy.

1. A check is made, to discover whether this particular entity has already been loaded. If so, there is no need to load it again. Processing proceeds to Step 11, where a Pointer to the Entity is returned, so that the calling function may directly reference its properties.
2. [Not Thing] Item( ): Get pointer to superior thing, see below and FIG. 7. As the EntityType 'Thing', is the root of the Hierarchy structure, all instances of subordinate EntityTypes (but not a Thing itself, hence the exclusion) will have a superior Thing. This step proceeds to get a reference to the entity's superior Thing, by a call to Item(ThingID). The ThingID is passed, along with the ID's of any other superior entities, in the call to the function. As a further consequence of the call, since Item( ) will load the Thing if not already loaded, it will load the full hierarchy particular to this Thing, including the entity which is being attempted to be registered. Hence this call is recursive if the Thing was not already loaded. Thereafter, the Thing being loaded, there is no further call to load the hierarchy, and hence to register the entity which originated the call to Thing. In the recursive case, this process again checks to see whether or not the subject of the original call has now in the interim been loaded.
3. [Not Thing, Not Assignment] This step calls Item( ) as required to get pointers to further superior entities. A Thing has none, and as Assignment has only a superior Thing, so both are excluded from this step. These pointers will be used in Step 6, to allow an entity to directly reference its superiors. This step also provides an opportunity to ensure that the superiors specified in the call to this function are all available, and appropriate to the entity being registered.
4. [Not Thing] See Step 2. Due to the recursive nature of the call to Item(ThingID), this step checks to see whether the originally requested entity has now in the interim been loaded in memory.
5. [All] In this step, a blank (uninitialised, data unspecified) instance of this class of entity is created in memory.
6. [Not Thing] All objects other than a Thing will have superiors. In this step, the pointers gathered in Steps 2 and 3 are now assigned to appropriate properties in the new memory instance. In this particular embodiment, only the immediate superior in the hierarchy is assigned to the new memory entity. Higher superiors may then be accessed by chaining entity properties, e.g.:
    (Visual Basic) Proposal.Tender.Assignment
    (C++) Proposal( )–>Tender( )–>Assignment( ).
7. [Not Decision] Create and link a Math Crystal. This step assigns the property values, passed as function arguments, to the appropriate Object.Properties. Hereafter, a client system or internal routine will be able to directly determine the state of the object, by accessing these Property Values.
8. Assign the Entity's data.
9. [Proposal Only] A Proposal has a Property Quantity or more exactly Consider Quantity. This is the amount that is being offered for consideration. Where the field is not used or required, it may be deemed to have a value 1. It is therefore meaningless to consider the impact of decisions (how much has been agreed, etc.) if the original target is not known. This step therefore adds a Decision as a "Consider", with Decision parameters Action and Bid-Wanted derived from the proposal properties.
10. [Thing Only] LoadHierarchy( ), see below and FIG. 3. As described earlier and elsewhere, loading a Thing also loads the entire hierarchy subordinate to a Thing. It is achieved by a call to the LoadHierarchy( ) function.

11. [All] Processing complete, the process will return a Pointer to the newly created memory object.

LoadHierarchy( )

Figure 4:
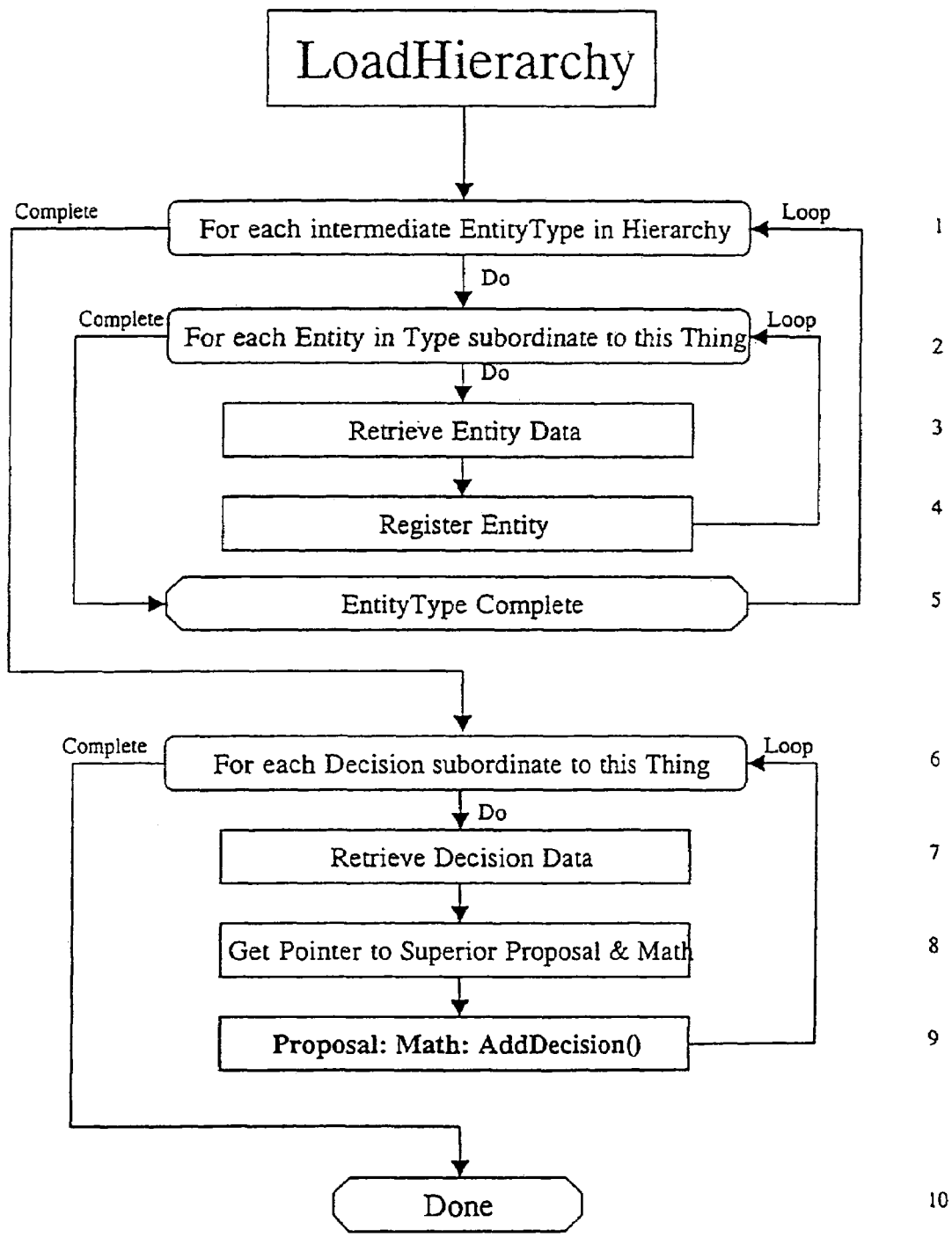
FIG. 4 is a flow chart illustrating the LoadHierarchy procedure in the preferred embodiment of the invention.

This is the facility to load directly a full subordinate tree, and is illustrated in FIG. 4. Note that Section I comprising Steps 1 to 5 processes the intermediate entity types Assignment, Tender and Proposal. Section II comprising Steps 6 to 9 processes the entity type Decision.

Arguments: The ID (ThingID) of the Thing Whose Hierarchy is to be Loaded.

The process needs to load all the Assignments, Tenders and Proposals associated with a Thing. It does this by Registering the Entities. The procedure is described therefore as follows.

Section I.
1. [Not Thing, Not Decision] The process initiates a sub-process for each intermediate EntityType in turn. The hierarchy subordinate to a Thing is being loaded, so Thing is redundant and excluded. Decisions are treated differently, later, and so here excluded.
2. Each EntityType's stored data (database table, in this embodiment) is searched for instances of this EntityType, with the particular Thing as their superior (ie: having matching ThingID). For each found instance, another sub-process is initiated, which comprises Steps 3 and 4.
3. For each entity instance matching the Thing, the entity's particular data is retrieved.
4. The new data is passed as arguments in a RegisterEntity( ) call, to load the found entity into memory. Control then passes back to Step 2, to search for the next matching instance.
5. Once each entity type has been fully searched, control passes back to Step 1. If all intermediate types are complete, it passes on to Step 6.

Section II.
6. With the intermediate types complete, the processing of Decisions is now initiated. A loop is initiated, wherein the Decisions table is searched for decisions subordinate to the required Thing (matching 'ThingID'). For each matching decision, a sub-process is initiated, comprising steps 7, 8 and 9.
7. For a matching decision, the data is retrieved from the table.
8. From the Decision's ProposalRefID Property, and following a call to Item( ), a pointer to the Decision's Superior Proposal is retrieved.
9. Proposal: Math: AddDecision( ) is executed, see below and FIG. 5.
10. Once all decisions matching the Thing have been processed, the process is complete.

Math: AddDecision

Figure 5:
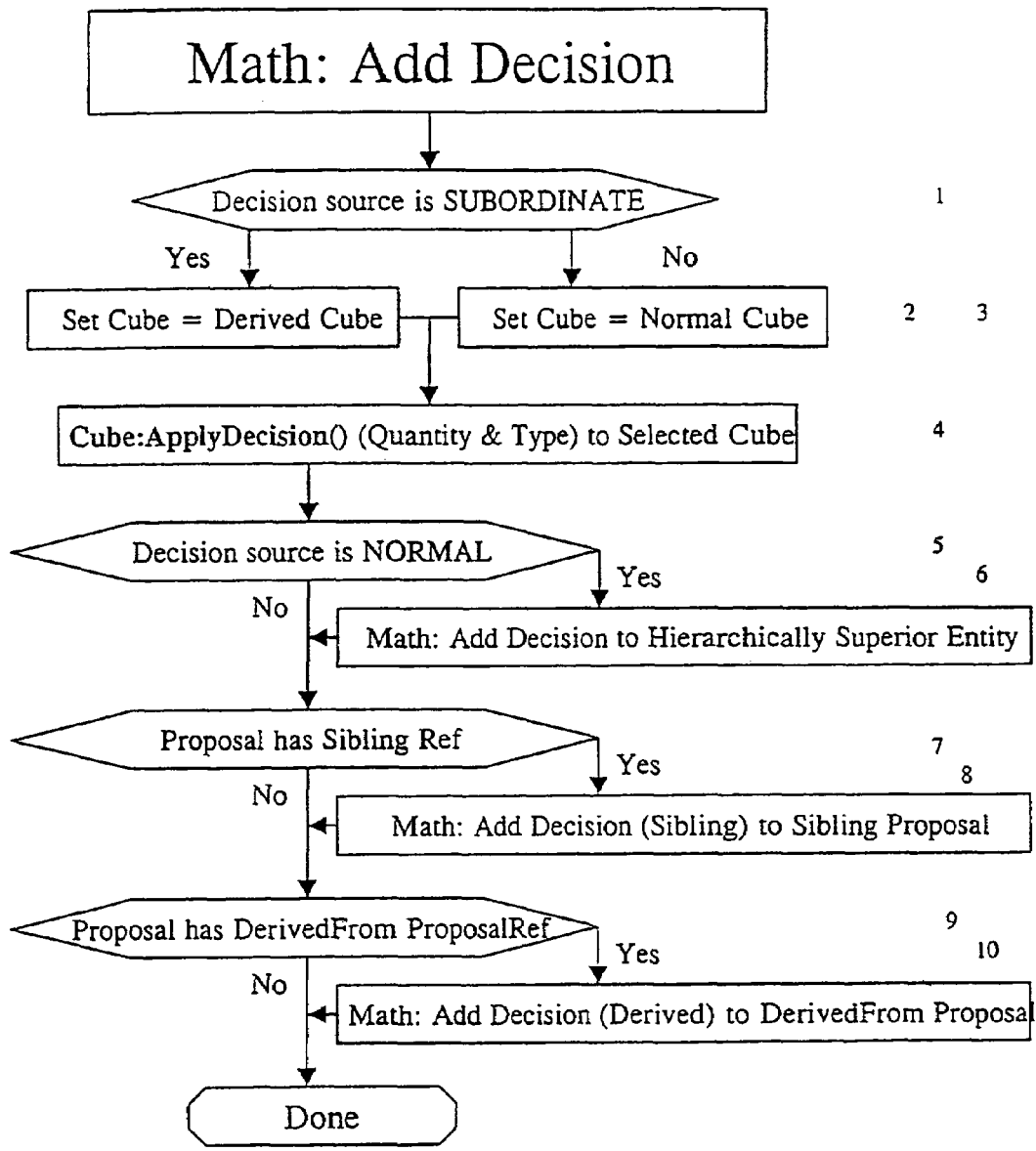
FIG. 5 is a flow chart illustrating the Math: AddDecision procedure in the preferred embodiment of the invention.

This function is called in NewEntity and LoadHierarchy above, and is illustrated in FIG. 5 of the drawings.

Argument: None.
1. A determination is made as to whether the decision source is subordinate. If it is, control passes to Step 2. If it is not, control passes to Step 3.
2. The procedure sets Cube=Derived Cube.
3. The procedure sets Cube=Normal Cube.
4. Cube:ApplyDecision( ), see below and FIG. 6. This determines the quality and type for the selected cube.
5. A determination is made as to whether the Decision Source is Normal (see Steps 1 to 3). If it is, control passes to Step 6. If it is not, control passes to Step 7.
6. Math: Add Decision to Hierarchically Superior Entity.
7. A determination is made as to whether the Proposal has a Sibling Ref. If it does, control passes to Step 8. If it does not, control passes to Step 9.
8. Math: Add Decision (Sibling) to Sibling Proposal.
9. A determination is made as to whether the Proposal is derived from another Proposal. If it is, control passes to Step 10.
If it is not, control passes to Step 11.
10. Math: Add Decision (Derived) to DerivedFrom Proposal.
11. Processing complete.

Cube: ApplyDecision( )

Figure 6:
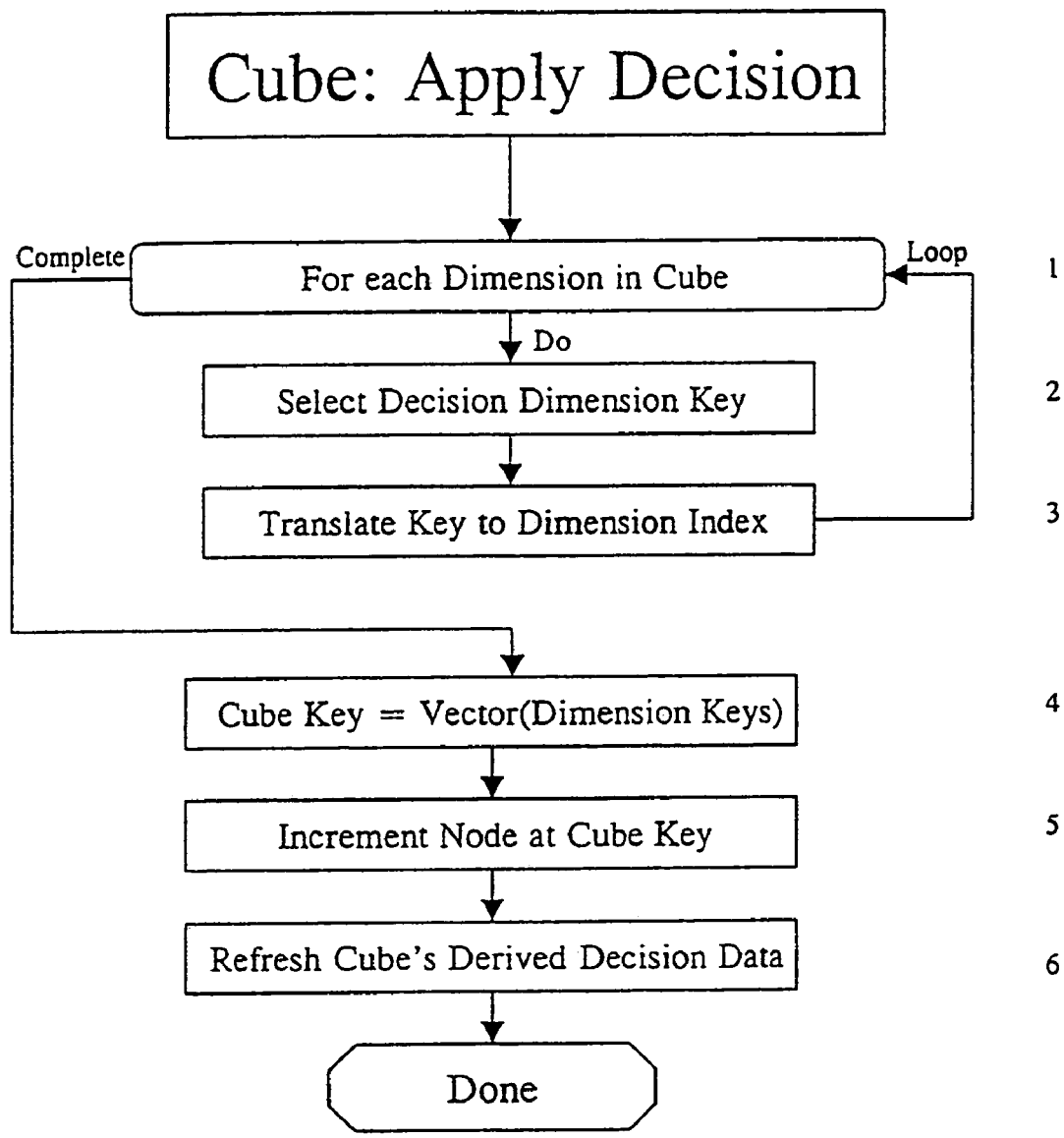
FIG. 6 is a flow chart illustrating the Cube: Apply Decision procedure in the preferred embodiment of the invention.

This is the facility to increment the Decision cube's data which is called in Math: AddDecision above, and is illustrated in FIG. 6.

Arguments: Decision parameters. Decision Quantity.
1. This process needs to translate the decision parameters into a node location. It therefore iterates through each of the decision parameters.
2. Selecting the Decision Dimension Key for each parameter in turn.
3. It translates the key into an index into that dimension of the cube. (See Decision Cube.)
4. The set of key indices thus obtained then form a vector into the cube, so selecting a particular node in the array.
5. The node at this key is then incremented by the noted quantity.
6. The derived fields in the decision schema are then recalculated.
7. The process is then complete.

Item( )

Figure 7:
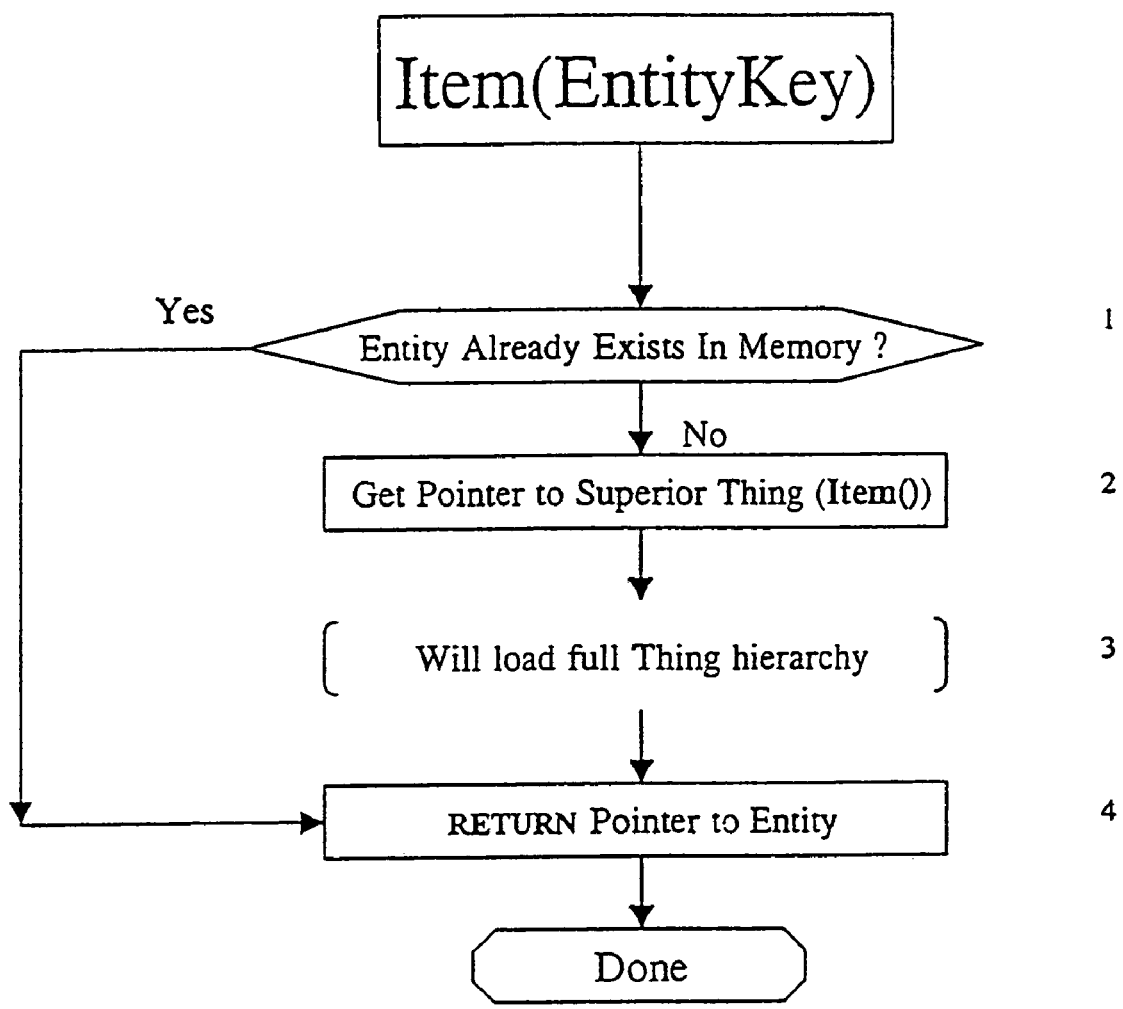
FIG. 7 is a flow chart illustrating the Item(EntityKey) procedure in the preferred embodiment of the invention.

This function is called in RegisterEntity above, and is the facility to retrieve a pointer to a member entity, and is illustrated in FIG. 7.

Arguments: Entity Key
1. From the Entity Key supplied, the collection of similar EntityTypes in memory is searched, to discover whether or not the Entity is already in memory. If it is, the process moves to Step 4, and returns a pointer to the entity.
2. If the entity is not in memory, the process calls the Item( ) function with the Entity's ThingID to get a pointer to the superior Thing.
3. Since a call to Item(ThingID) always loads the full hierarchy, subsequent new entities will also be directly loaded into memory. Step 3 is not a process, but simply acknowledges that Thing, and its full hierarchy, including the required Entity, will be in memory at this time.
4. The collection of the EntityTypes will now be searched again, and the appropriate pointer returned to the calling function.
5. The process is complete.

Math: GetMathvalue.

Figure 8:
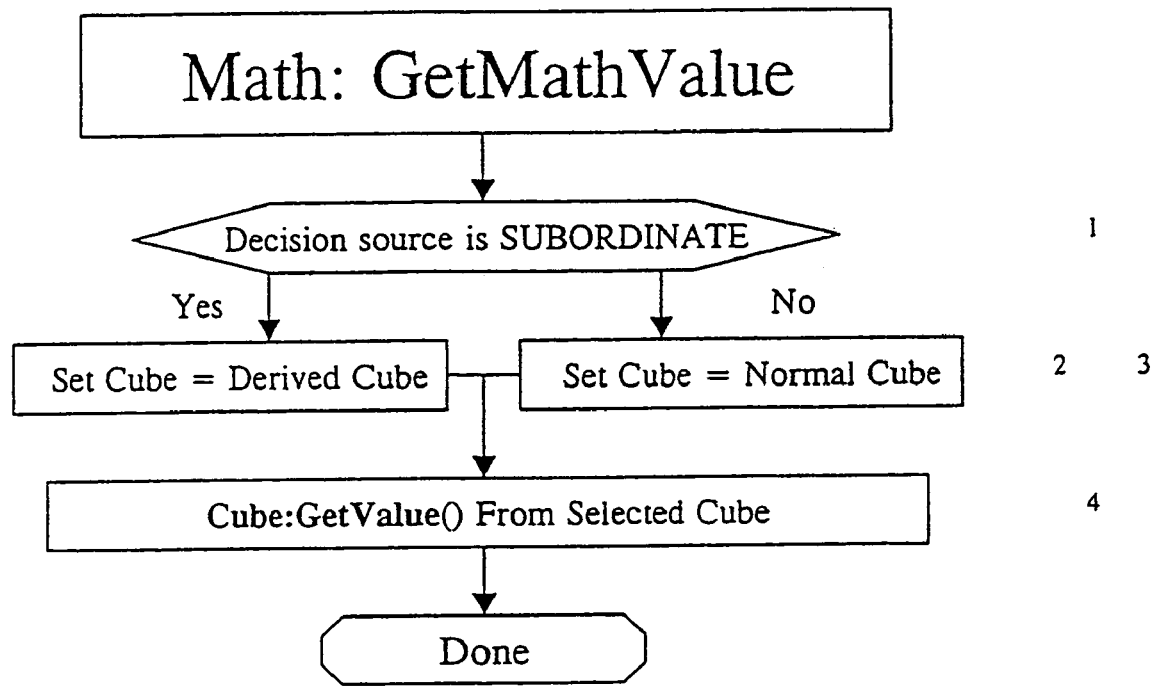
FIG. 8 is a flow chart illustrating the Math: GetMathValue procedure in the preferred embodiment of the invention.

This is illustrated in FIG. 8 of the drawings. This function can be called by a Client system, in order to find out the current status of the computer system.

Argument: None.
1. A determination is made as to whether the decision source is subordinate. If it is, control passes to Step 2. If it is not, control passes to Step 3.

2. The procedure sets Cube=Derived Cube.
3. The procedure sets Cube=Normal Cube.
4. Cube: GetValue( ), see below and FIG. 9. The value is retrieved from the selected cube.
5. Processing complete.

Cube: GetValue( )

Figure 9:
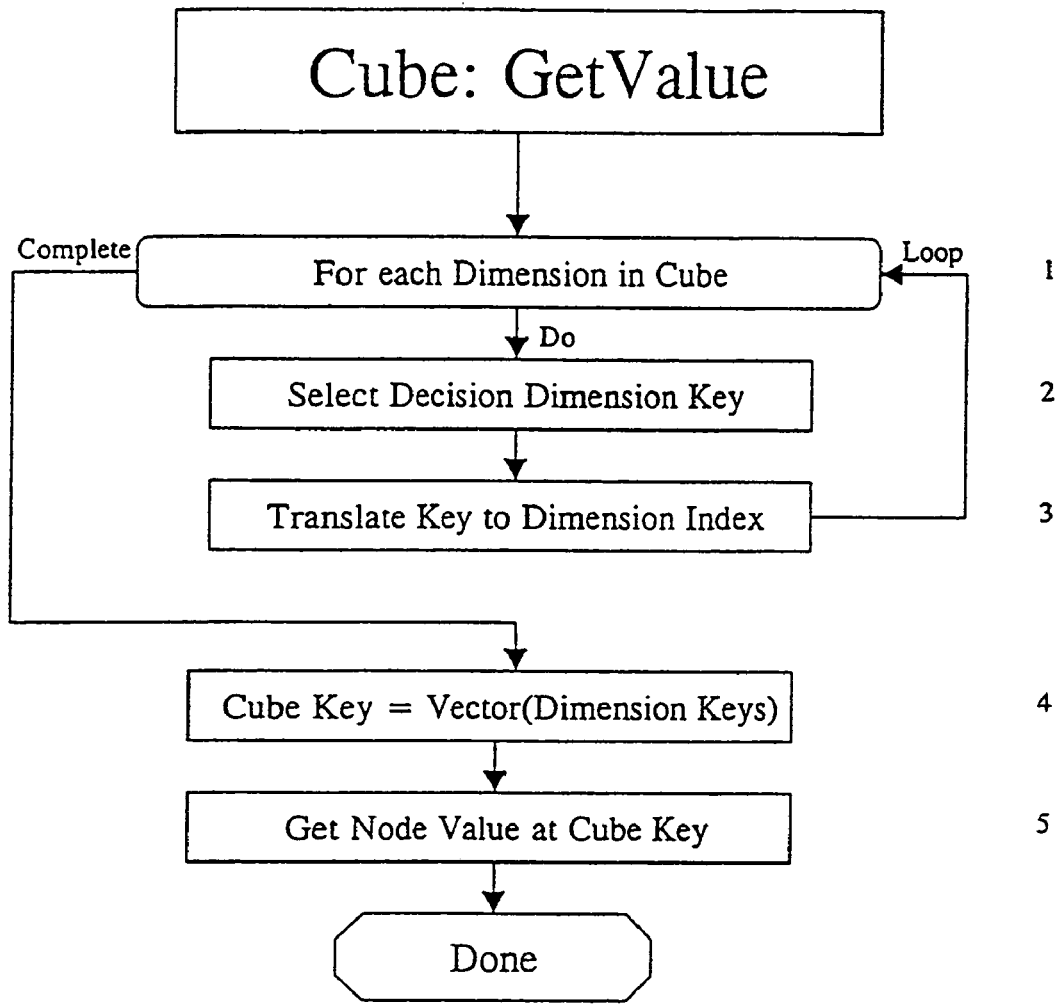
FIG. 9 is a flow chart illustrating the Cube: GetValue procedure in the preferred embodiment of the invention.

This is the facility to retrieve the Decision cube's data which is called in Math: GetMathValue, and is illustrated in FIG. 9.

Arguments: Decision Parameters. Decision Quantity.
1. This process needs to translate the decision parameters into a node location. It therefore iterates through each of the decision parameters.
2. Selecting the Decision Dimension Key for each parameter in turn.
3. It translates the key into an index into that dimension of the cube. (See Decision Cube)
4. CubeKey=Vector(DimensionKeys). The set of key indices thus obtained then form a vector into the cube, so selecting a particular node in the array.
5. The value of the node at this cube key is then retrieved.
6. Processing complete.

Computer Resources & Specification

While not restricted to these particular resources, the preferred embodiment of the system has been implemented on computer systems currently available.

The prototype of the system was developed on a 133 MHZ Pentium Notebook PC with 32 Mb RAM (random access memory), and a 2 Gb Hard Disk, running Microsoft Windows NT, with Microsoft Access as the Database, and with the software developed and prototyped both in Microsoft Visual Basic 5, and Microsoft Visual C++.

The system was then ported to a Sun Microsystems Ultra5, running Solaris 2.51, with a Sybase System 11 SQL Server database resource, and written in Unix/Ansi C++.

Thus, the key requirements of the system are readily met by the conjunction of a typical computer system, a typical software coding language, and a typical database resource.

Software Design

It is readily understood that software design and implementation must take into account the possibility of function calls failing for numerous causes. Since this is a fundamental requirement in software engineering, which must be managed in any commercial implementation, the needs and skills appropriate to support failure will therefore be familiar to any software engineer skilled in the art. As such, they do not feature as an aspect of the claims of the system, such routines and techniques for developing robust code have been considered immaterial to the explicit description of the particular embodiment of the system.

Scope of the Preferred Embodiment

The preferred embodiment implements a fixed and limited hierarchy, of specified types yet which is of sufficient power to provide a modelling and management facility which will cope with typical transactions and negotiations encompassed in the world today.

In combination with a facility to provide agents for execution of processes, it then encompasses a uniform and general transaction facility, suitable for example business, domestic, military and governmental use.

To the extent that these agents may themselves be computer processes, then such an environment offers a computerised transaction facility. Where these agents do not need to refer to non-computer resources for their information to fulfil their transactions, then to that extent, the environment so described becomes an automated one.

Database

For each entity type there is a corresponding database table. The table is given the name of the entity type. Thus, the existence of a 'Thing' entity leads to the existence of a 'Thing' table.

Thing Table

The Thing Table contains references to objects external to the system. Each new Thing record added to the table has a unique ThingID.

| Field Name | Type | Notes on Usage |
| --- | --- | --- |
| ThingID | Long | Uniquely identifies a Thing |
| ClientSystem | String | Identifies the Client System |
| ClientSystemReference | Long | Identifies the external object in the Client System |
| ClientRefDescription | String | Optional - Description for client convenience |

Assignment Table

The Assignment Table contains references to processes to be applied to Thing entities. Each new Assignment record added to the table has a unique AssignmentID.

| Field Name | Type | Notes on Usage |
| --- | --- | --- |
| AssignmentID | Long | Uniquely identifies an Assignment |
| ThingRefID | Long | Thing this Assignment is for |
| Instigator | String | Supplied by client to identify who created entity |
| InstigatorRef | Long | Supplied by client as external reference to Instigator |
| PredecessorAssignmentRefID | Long | |
| Redirection | String | Precise nature of assignment |
| Quantity | Double | How much of the redirection is requested |
| The following fields can optionally be included: | | |
| Deadline | Date | Date (including time) by which an assignment must be complete |
| PreferredByDate | Date | Date (including time) by which it would be preferred to have the assignment complete |

Tender Table

The tender table contains the information which groups proposals. Each new Tender record added to the table has a unique TenderID.

| Field Name | Type | Notes on Usage |
| --- | --- | --- |
| TenderID | Long | Uniquely identifies a Tender |
| ThingRefID | Long | Thing this Tender is for |
| AssignmentRefID | Long | The superior Assignment in the hierarchy |

-continued

| Field Name | Type | Notes on Usage |
| --- | --- | --- |
| Instigator | String | Supplied by client to identify who created entity |
| InstigatorRef | Long | Supplied by client as external reference to Instigator |
| Quantity | Double | How much this tender relates to |

Proposal Table

The Proposal contains details of the negotiation with an agent to perform the process. Each new Proposal record added to the table has a unique ProposalID.

| Field Name | Type | Notes on Usage |
| --- | --- | --- |
| ProposalID | Long | Uniquely identifies a Proposal |
| ThingRefID | Long | Thing this Proposal is for |
| AssignmentRefID | Long | The superior Assignment in the hierarchy |
| TenderRefID | Long | The superior Tender in the hierarchy |
| Instigator | String | Supplied by client to identify who created entity |
| InstigatorRef | Long | Supplied by client as external reference to Instigator |
| SuperiorProposalRefID | Long | |
| SiblingProposalRefID | Long | |
| Upline | String | Who has an interest in the process being performed |
| Downline | String | Who will perform the process |
| GoingUp | Boolean | Who initiated the proposal |
| BidWanted | Boolean | Does acceptance grant right to act |
| Action | String | The action in regard to performing the process |
| ConsiderQuantity | Double | How much of the action is proposed |
| The following fields can optionally be included: | | |
| ReplyRequiredByDate | Date | Date by which the right to make a decision (particularly accept/decline) expires |
| CompletionRequiredByDate | Date | Date by which the accepted quantity must be complete |

| Field Name | Type | Notes on Usage |
| --- | --- | --- |
| DecisionID | Long | Uniquely identifies a Decision |
| ProposalRefID | Long | Uniquely identifies a Proposal |
| Instigator | String | Supplied by client to identify who created entity |
| InstigatorRef | Long | Supplied by client as external reference to Instigator |
| ConsiderQuantity | Double | |
| AnnulQuantity | Double | Amount of original proposal withdrawn |
| DeclineQuantity | Double | A response, Amount declined from proposal |
| AcceptQuantity | Double | A response, Amount accepted from proposal |
| ForwardQuantity | Double | A response, Amount forwarded from proposal |

Instigator and Instigator Reference

At the creation of an entity record, the client system can provide two references. One is the instigator of the entity creation, and the other is a meaningful reference to the instigator.

These fields are available for each entity type, however, they are of particular significance to the creation of Thing entities.

Decision Schema

The preferred embodiment implements a three-dimensional decision schema, with dimensions: Action, Authority and Resolution.

Direct fields:

Direct fields represent the immediate description of the decision. The Index for each dimension in this embodiment is noted in brackets.

Action:

| | |
| --- | --- |
| [0] Do: | The potential exists that something be done. |
| [1] NotDo: | The potential no longer exists for something to be done. |
| [2] Done: | The claim is that something has in fact been done. |

Resolution:

| | |
| --- | --- |
| [0] Consider: | It is being put to an agent to (action) something. |
| [1] Annul: | The (action) is no longer available for consideration. |
| [2] Decline: | The agent declines to pursue the action. |
| [3] Accept: | The agent accepts to pursue the action. |
| [4] Forward: | The agent accepts the responsibility for the action but will not perform the action. |

Authority:

| | |
| --- | --- |
| [0] FullAuthority: | Upon acceptance, the agent is free to pursue the action. |
| [1] BidWanted: | There is no authority to pursue the action. |

Notes to clarify the above:

Consider—the preferred embodiment embeds this in the proposal. It is necessary for the logical process that it be part of the decision schema, but it more naturally represents the opportunity or quantity to be decided upon.

Annul—allows the modelling of the withdrawal of an offer, rather than the offer being declined by the invitee.

Forward—allows the modelling of the situation where a salesman accepts a client order, but will not be fulfilling it himself. It will be fulfilled, for example, by the factory floor.

BidWanted—allows a tender for a contract to be modelled, or an offer of tickets, where the final allocation will be at the discretion of the offeror, not the bidder.

In the following, these are written in the order: Resolution.Action.Authority.

Derived Fields:

Given the events (decisions) it is then appropriate to ask what the current situation is. The creation of derived fields therefore allows logical processing or mathematics to be done on the direct fields. The preferred embodiment implements the following derived fields. Calculations to generate the derived fields are noted beside the field description. The Identifiers are taken to indicate the values or quantities associated by those identifiers.

For example: (Do−NotDo−Done=Open) should be read as: If quantity required as "Do"=12, and quantity to "NotDo"=5 and quantity claimed as "Done"=3, then the quantity remaining "Open" is 12−5−3=4, ie 12 minus 5 minus 3. Dimension Indices are in brackets.

| Action | | |
|---|---|---|
| [3] Open: | (Do - NotDo - Done) | Everything not cancelled or complete |
| Resolution | | |
| [5] Available: | (Consider - Annul) | Everything not withdrawn |
| [6] Potential: | (Available - Declined) | Everything not declined |
| [7] Pending: | (Potential - Accept - Forward) | Everything not decided |
| Authority | | |
| No derived fields | | |

EXAMPLES

Natural examples of decisions which may be expressed in this schema therefore are:

| | |
|---|---|
| Accept.Do | Accept to do something. |
| Decline.Do: | Decline to do something. |
| Extending slightly: | consider the following. |
| Accept.NotDo | Accept to NotDo something (eg: cancel an order) |
| Decline.NotDo | Declines to NotDo something (eg: too late to cancel.) |
| Consider further: | |
| Accept.Done: | Accepts that something has been done. |
| Decline.Done: | Decline to recognise that something has been done. |

In the context of the system, a Do recognises the intent or potential to Do something, so that to Accept.Do for example sets up an expectation that whatever is being referred to will in due course be done.

To recognise a Do is therefore to OPEN a potential. To CLOSE a potential, so that it can be dismissed from attention, one of two things must happen. Either it will in due course be Done or a subsequent agreement will be set up to NotDo that which is being referred to.

The set [Do, NotDo, Done] therefore reflects a fundamental and natural set of potential intents, actions or claims. Given a potential that something can be done, so the process is initiated or OPENED as a Do; and it remains OPEN until either there is a matching NotDo, or it is Done. Whereupon it is in effect CLOSED and requires no further attention.

In the example outline above the decision cube will have dimensions [4] [8] [2] and each element of the array will be initialised to zero.

Worked Example

This will apply 2 decisions to a Cube. The first will reflect asking someone to consider doing 12 of something (buying 12 bottles of water, for example). The second will reflect the agreement of the individual to the proposal. The details of the nature of the transaction are not stored in nor relevant to either the cube or the system itself. Rather, only references to the existence of the transaction are stored. The system manages and captures the complexity of the negotiation, but leaves the description of the transaction to the client system.

| | |
|---|---|
| Decision 1: | Asking someone to consider doing 12 of something. |
| Decision Specification: | Narrative/Intuitive description: |
| Resolution: CONSIDER | Please consider the following proposal |
| Action: DO | to do |
| Quantity: 12 | 12 (of something) |
| Authority: FULL | with my permission to proceed, if you accept. |

Cube Vector:
(Do=0, Consider=0, Authority=0): Vector=(0, 0, 0).

Cube Node:
The active node is therefore Cube[0] [0] [0].
Incrementing the value: the node's value is increased by the decision quantity.
Cube[0] [0] [0]=Cube[0] [0] [0]+12;
The node Consider.Do.Full is now 12.
Recalculation of the derived fields
Only a typical case is shown here, for illustration.
Available.Do.Full=Consider.Do.Full−Annul.Do.Full=12−0=12

| | |
|---|---|
| Decision 2: | The invitee accepts 8 of the proposal |
| Decision Type: | Accept.Do.Full |
| Decision Quantity: | 8 |
| Decision Vector: | [Do = 0] [Accept = 3] [FullAuthority = 0] |

Implementation:
Cube[0] [3] [0]=Cube[0] [3] [0]+8;
Restricting to the Do.Full indices, the Resolution dimension therefore now looks as follows:

| Resolution | Quantity |
|---|---|
| Consider | 12 |
| Annul | 0 |
| Available | 12 |
| Declined | 0 |
| Potential | 12 |
| Accept | 8 |
| Forward | 0 |
| Pending | 4 |

For a given Action therefore, 2 key foci exist:
How much has been Accepted; and how much is still Pending.
The first acknowledges a commitment to something, allowing planning.
The second, unresolved but potential commitments, require follow-up.

Further Embodiment

The system itself is not limited to or by the preferred embodiment. A more sophisticated embodiment may be implemented without impinging upon or materially reshaping the fundamentals of the system herein described. Some of the additions to the preferred embodiment are now outlined.

Entity Properties

The system may include the entity property EntityCreatedAT to store its TIME of creation.

The system may include the entity property EntityVoid to support a facility to remove an Entity from consideration, in effect deleting it without actually removing it from the database.

The system may include the entity property EntityClosed to enable a client to decide not to post any further transactions to that entity. Note that this restriction would not be controlled by the system but by the client system, otherwise it violates the 'Reflect don't Control' principle of the system. Additional properties which suggest internal control should be avoided or renamed.

An Assignment entity may include further information above and beyond the simple identification of the transformation. For example, if a further embodiment of the system were to support deadline modelling, a deadline for the Assignment might be further included as a field in the Assignment entity.

Audit Trail

The system may include an audit trail to record the details of all transactions passing through the system.

Math in Memory

The system may include storing the complex calculations in memory to speed up the overall performance.

Addition Functions for Client Systems

The system may include further facilities to enrich the range of the functionality available to the client system. An example is a query facility, taking advantage of the fact that the storage of the embodiment is a database, so that client applications may implement queries such as:

| Assignments outstanding: | Assignments not Closed, Pending non-zero |
| --- | --- |
| Assignments overdue: | Assignments not Closed, Created before X Date |
| Agreements in place: | Proposals with Downline = Y |

Deleting Entities

The system may include a facility to delete entity data. In the preferred embodiment no such facility exists. It is a design principle that the system does not 'forget' or 'lose' information. The preferred embodiment regards data deletion, therefore, as an internal housekeeping function for the user.

Clearly, on limited capacity machines, an unconstrained policy of adding data without any facility for deletion will overwhelm the resources at some point. Therefore, a policy on deletion of data would be prudent. This will typically depend on the rate of accretion of new data, the importance of the data, the resources available, and policy on data storage, archiving etc.

What is claimed is:

1. A uniform and generalized transaction modelling computer system operable with a separate client system and adapted to perform negotiation and decision functions related to a transaction, the system comprising a processor and a computer-readable storage medium, the computer-readable storage medium providing locations for a plurality of entities, the entities being accessible to the processor, and the entities including at least one entity of each of the following forms:

a first entity (Thing entity) having the properties of identifying a client system and uniquely identifying using a client system reference an object in that client system;

a second entity (Proposal entity) created by the client system for defining a transaction, the second entity being subordinate directly or indirectly to a first entity and having the properties of identifying at least one external agent to carry out a transformation in relation to the first entity and of identifying at least one counter-party to the transaction; and a third entity (Decision entity) capable of communicating with a second entity and having the properties of defining the types of decision that may be made including at least a decision to accept and a decision to decline the transaction, and determining the responses in relation to those decisions.

2. A computer system according to claim 1, further comprising at least one fourth entity (Assignment entity) subordinate to an associated first entity, the fourth entity having the properties of uniquely identifying the associated first entity, and identifying a particular type of assignment or transformation to be applied to the first entity.

3. A computer system according to claim 2, in which the fourth entity also identifies a quantity.

4. A computer system according to claim 1, in which an agent identified by the second entity includes at least two parties to a transaction.

5. A computer system according to claim 4, in which the second entity additionally identifies the direction of negotiation between the parties.

6. A computer system according to claim 1, wherein there are a plurality of second entities, one of which (Subordinate Proposal entity) is subordinate to another second entity and includes the property of identifying the second entity to which it is subordinate.

7. A computer system according to claim 1, further comprising a plurality of associated second entities (Sibling Proposal entities) all of which are directly subordinate to said second entity or to another associated second entity and each including the property of identifying the second entity to which they are subordinate whereby the said associated second entities include quantities which together correspond to the quantity of the said second entity to which they are subordinate.

8. A computer system according to claim 1, in which the third entity is multidimensional and contains multidimensional vectors indicative of values resulting from an associated second entity.

9. A computer system according to claim 8, in which at least one third entity is a partial entity indicating a partial response from a second entity.

10. A computer system according to claim 1, wherein there are a plurality of second entities and further comprising at least one further entity (Tender entity) associated with a plurality of second entities and a single first entity, and identifying at least a quantity.

11. A computer system according to claim 1, in which the system does not validate data input into the system.

12. A computer system according to claim 1, in which the system provides for at least the following functions:
   (i) creation of a new entity,
   (ii) loading a selected entity or entities into a working memory of the computer system,
   (iii) incrementing a multidimensional array,
   (iv) retrieving a value from an entity, and
   (v) advising the client system of an event.

13. A uniform and generalized transaction modelling computer system operable with a separate client system and adapted to perform negotiation and decision functions related to a transaction, the system comprising a processor and a computer-readable storage medium, the computer-readable storage medium providing locations for a plurality of entities, the entities being accessible to the processor, and the entities including at least one entity of each of the following forms:

a first entity (Thing entity) having the properties of identifying a client system and uniquely identifying an object in that client system;

a second entity (combined Proposal/Assignment entity) created by the client system for defining a transaction, the second entity being subordinate to a first entity and having the properties of (i) identifying at least one external agent to carry out a transformation in relation to the first entity and identifying at least one counter-party to the transaction, and (ii) uniquely identifying the associated first entity, and identifying a particular type of assignment or transformation to be applied to the first entity; and a third entity (Decision entity) capable of communicating with a second entity and having the properties of defining the types of decision that may be made including at least a decision to accept and a decision to decline the transaction, and determining the responses in relation to those decisions.

14. A uniform and generalized transaction modelling computer system operable with a separate client system and adapted to perform negotiation and decision functions related to a transaction, the system comprising a processor and a computer-readable storage medium, the computer-readable storage medium providing means for storage of a plurality of entities, the entities being accessible to the processor, the system comprising:

first means defining a first entity (Thing entity) having the properties of identifying a client system and uniquely identifying an object in that client system;

second means defining a second entity (Proposal entity) for defining a transaction, the second entity being subordinate directly or indirectly to a first entity and having the properties of identifying at least one external agent to carry out a transformation in relation to the first entity and of identifying at least one counter-party to the transaction; and third means defining a third entity (Decision entity) capable of communicating with means defining a second entity and having the properties of defining the types of decision that may be made including at least a decision to accept and a decision to decline the transaction, and determining the responses in relation to those decisions.

15. A computer system according to claim 14, further comprising at least one fourth means defining a fourth entity (Assignment entity) subordinate to an associated first entity, the fourth entity having the properties of uniquely identifying the associated first entity, and identifying a particular type of assignment or transformation to be applied to the first entity.

16. A computer system according to claim 15, in which the fourth entity also identifies a quantity.

17. A computer system according to claim 14, in which an agent identified by means defining the second entity includes at least two parties to a transaction.

18. A computer system according to claim 17, in which the means defining a second entity additionally identifies the direction of negotiation between the parties.

19. A computer system according to claim 14, wherein there are a plurality of means defining a second entity, one of which (Subordinate Proposal entity) is subordinate to another second entity and includes the property of identifying the other second entity to which it is subordinate.

20. A computer system according to claim 14, further comprising a plurality of means defining associated second entities (Sibling Proposal entities) all of which are directly subordinate to said second entity or to another second entity and each including the property of identifying the second entity to which they are subordinate whereby the said associated second entities include quantities which together correspond to the quantity of the said second entity to which they are subordinate.

21. A computer system according to claim 14, in which the third entity is multidimensional and contains multidimensional vectors indicative of values resulting from an associated second entity.

22. A computer system according to claim 21, in which at least one third entity is a partial entity indicating a partial response from a second entity.

23. A computer system according to claim 14, wherein there are a plurality of means defining a second entity and further comprising at least one means defining a further entity (Tender entity) associated with a plurality of second entities and a single first entity, and identifying at least a quantity.

24. A computer system according to claim 14, in which the system does not validate data input into the system.

25. A computer system according to claim 14, in which the system provides for at least the following functions:
    (i) creation of a new entity,
    (ii) loading a selected entity or entities into a working memory of the computer system,
    (iii) incrementing a multidimensional array,
    (iv) retrieving a value from an entity, and
    (v) advising the client system of an event.

26. A uniform and generalized transaction modelling computer system operable with a separate client system and adapted to perform negotiation and decision functions related to a transaction, the system comprising a processor and a computer-readable storage medium, the computer-readable storage medium providing means for storage of a plurality of entities, the entities being accessible to the processor, the system comprising:

first means defining a first entity (Thing entity) having the properties of identifying a client system and uniquely identifying an object in that client system;

second means defining a second entity (combined Proposal/Assignment entity) for defining a transaction, the second entity being subordinate to a first entity and having the properties of (i) identifying at least one external agent to carry out a transformation in relation to the first entity and of identifying at least one counter-party to the transaction, and (ii) uniquely identifying the associated first entity, and identifying a particular type of assignment or transformation to be applied to the first entity; and third means defining a third entity (Decision entity) capable of communicating with means defining a second entity and having the properties of defining the types of decision that may be made including at least a decision to accept and a decision to decline the transaction, and determining the responses in relation to those decisions.

27. A uniform and generalized method of programming a computer as a transaction modelling system, the computer system being operable with a separate client system and adapted to perform negotiation and decision functions related to a transaction, the method comprising the steps of:

providing a computer system comprising a processor and a computer-readable storage medium, the computer-readable storage medium providing locations for a plurality of entities, the entities being accessible to the processor;

generating with said processor on said computer-readable storage medium a first entity (Thing entity) having the properties of identifying a client system and uniquely identifying using a client system reference an object in that client system;

generating with said processor on said computer-readable storage medium and using said client system a second entity (Proposal entity) for defining a transaction, the second entity being subordinate directly or indirectly to a first entity and having the properties of identifying at least one external agent to carry out a transformation in relation to the first entity and of identifying at least one counter-party to the transaction; and generating a third entity (Decision entity) capable of communicating with a second entity and having the properties of defining the types of decision that may be made including at least a decision to accept and a decision to decline the transaction, and determining the responses in relation to those decisions.

28. A computer program product directly loadable into the internal memory of a digital computer, and comprising software code portions for causing the computer to become a computer system in accordance with claim 1 when the product is run on a computer.

29. A computer program product directly loadable into the internal memory of a digital computer, and comprising software code portions for causing the computer to become a computer system in accordance with claim 14 when the product is run on a computer.

* * * * *